United States Patent
Levijoki et al.

(10) Patent No.: US 8,495,862 B2
(45) Date of Patent: Jul. 30, 2013

(54) SYSTEM AND METHOD FOR DETECTING LOW QUALITY REDUCTANT AND CATALYST DEGRADATION IN SELECTIVE CATALYTIC REDUCTION SYSTEMS

(75) Inventors: Stephen Paul Levijoki, Swartz Creek, MI (US); Yue-Yun Wang, Troy, MI (US); Brett B. Thompson, Farmington Hills, MI (US)

(73) Assignee: GM Global Technology Operations LLC

( * ) Notice: Subject to any disclaimer, the term of this patent is extended or adjusted under 35 U.S.C. 154(b) by 412 days.

(21) Appl. No.: 12/974,366

(22) Filed: Dec. 21, 2010

(65) Prior Publication Data
US 2012/0085082 A1 Apr. 12, 2012

Related U.S. Application Data

(60) Provisional application No. 61/390,289, filed on Oct. 6, 2010.

(51) Int. Cl.
*F01N 11/00* (2006.01)

(52) U.S. Cl.
USPC ............... 60/277; 60/274; 60/276; 60/286; 60/287; 60/295; 60/301

(58) Field of Classification Search
USPC ................... 60/274, 276, 277, 282, 286, 287, 60/295, 301
See application file for complete search history.

(56) References Cited

U.S. PATENT DOCUMENTS

| | | | |
|---|---|---|---|
| 2007/0044457 A1* | 3/2007 | Upadhyay et al. | 60/295 |
| 2008/0178656 A1* | 7/2008 | Nieuwstadt et al. | 73/23.31 |
| 2010/0043397 A1* | 2/2010 | Wang et al. | 60/273 |
| 2010/0043400 A1* | 2/2010 | Wang et al. | 60/276 |
| 2010/0083636 A1* | 4/2010 | Wang et al. | 60/277 |
| 2010/0115918 A1* | 5/2010 | Sawada et al. | 60/276 |
| 2010/0154386 A1* | 6/2010 | Perrin et al. | 60/277 |
| 2010/0180576 A1* | 7/2010 | Wang et al. | 60/276 |
| 2011/0005203 A1* | 1/2011 | Gady | 60/276 |
| 2012/0085082 A1 | 4/2012 | Levijoki et al. | |

OTHER PUBLICATIONS

U.S. Appl. No. 12/245,830, filed Oct. 6, 2008, Yue-Yun Wang.

* cited by examiner

*Primary Examiner* — Thomas Denion
*Assistant Examiner* — Jorge Leon, Jr.

(57) ABSTRACT

A control system for a selective catalytic reduction (SCR) system includes a conversion efficiency determination module, an ammonia slip determination module, and a diagnostic module. The conversion efficiency determination module determines a conversion efficiency of an SCR catalyst. The ammonia slip determination module determines an amount of ammonia slip across the SCR catalyst when the conversion efficiency is less than a predetermined threshold. The diagnostic module determines pass/fail statuses of a reductant supply and the SCR catalyst based on the amount of ammonia slip and at least one ammonia slip threshold.

20 Claims, 5 Drawing Sheets

SYSTEM AND METHOD FOR DETECTING LOW QUALITY REDUCTANT AND CATALYST DEGRADATION IN SELECTIVE CATALYTIC REDUCTION SYSTEMS

CROSS-REFERENCE TO RELATED APPLICATIONS

This application claims the benefit of U.S. Provisional Application No. 61/390,289, filed on Oct. 6, 2010. The disclosure of the above application is incorporated herein by reference in its entirety.

FIELD

The present disclosure relates to exhaust treatment systems and more particularly to a system and method for detecting low quality reductant and catalyst degradation in selective catalytic reduction (SCR) systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combine air and fuel to create an air/fuel (A/F) mixture that is combusted within a plurality of cylinders. The combustion of the A/F mixture drives pistons which rotatably turn a crankshaft generating drive torque. In compression ignition (CI) engines, air may be drawn into the cylinders and compressed using the pistons. Fuel may then be injected into the compressed air causing the pressurized A/F mixture to combust. For example, CI engines include diesel engines.

Exhaust gas produced during combustion may be expelled from the cylinders into an exhaust manifold. The exhaust gas may include carbon monoxide (CO) and hydrocarbons (HC). The exhaust gas may also include nitrogen oxides (NOx) due to the higher combustion temperatures of CI engines compared to spark ignition (SI) engines. An exhaust treatment system may treat the exhaust gas to remove CO, HC, and/or NOx. For example, the exhaust treatment system may include at least one of an oxidation catalyst (OC), NOx absorbers/adsorbers, a selective catalytic reduction (SCR) system, a particulate matter (PM) filter, and catalytic converters.

In the SCR process, a dosing agent is injected into the exhaust gas by a dosing system. For example, the dosing agent may be pure anhydrous ammonia, aqueous ammonia, or urea. The dosing agent includes a reductant that reacts with the NOx in the exhaust gas. For example, the reductant may be ammonia ($NH_3$). The reductant mixes with the NOx in the exhaust gas and the mixture may be absorbed onto the SCR catalyst. The SCR catalyst may then break down the absorbed mixture forming water vapor ($H_2O$) and nitrogen gas ($N_2$). The SCR process, therefore, may significantly reduce NOx emissions.

SUMMARY

A control system for a selective catalytic reduction (SCR) system includes a conversion efficiency determination module, an ammonia slip determination module, and a diagnostic module. The conversion efficiency determination module determines a conversion efficiency of an SCR catalyst. The ammonia slip determination module determines an amount of ammonia slip across the SCR catalyst when the conversion efficiency is less than a predetermined threshold. The diagnostic module determines pass/fail statuses of a reductant supply and the SCR catalyst based on the amount of ammonia slip and at least one ammonia slip threshold.

A method for controlling a selective catalytic reduction (SCR) system includes determining a conversion efficiency of an SCR catalyst, determining an amount of ammonia slip across the SCR catalyst when the conversion efficiency is less than a predetermined threshold, and determining pass/fail statuses of a reductant supply and the SCR catalyst based on the amount of ammonia slip and at least one ammonia slip threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
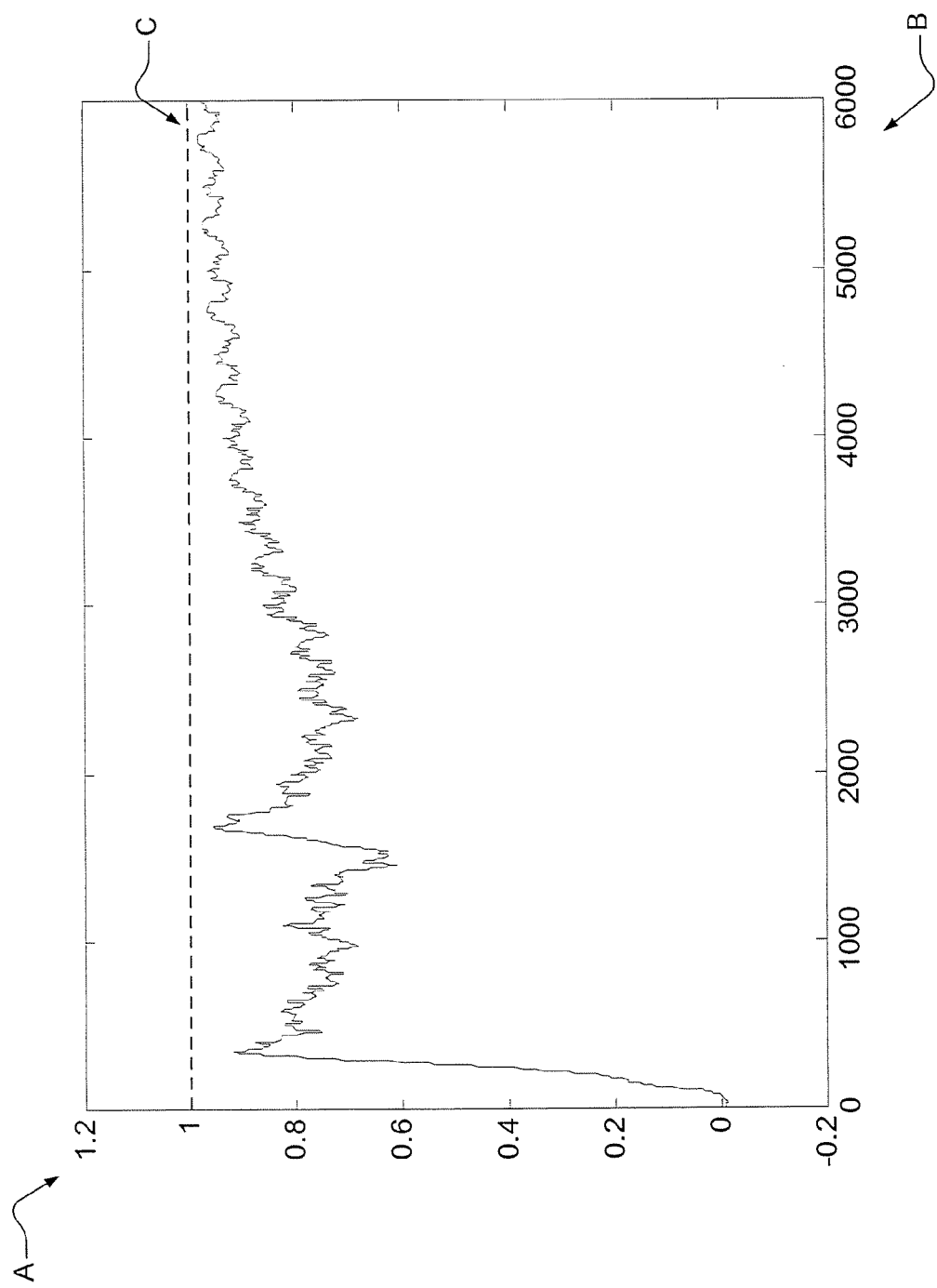
FIG. 1 is a graph illustrating increased reductant injection due to a low quality reductant.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A selective catalytic reduction (SCR) system may include an SCR catalyst and nitrogen oxide (NOx) sensors disposed upstream and downstream from the SCR catalyst. The NOx sensors may measure an amount of NOx in the exhaust stream before and after the SCR catalyst. The NOx sensors may also detect ammonia ($NH_3$) and thus may be called "cross-sensitive" (i.e., capable of detecting both NOx and $NH_3$). The downstream NOx sensor, therefore, may detect ammonia downstream that was not absorbed by the SCR catalyst ("ammonia slip").

SCR systems may monitor a conversion efficiency of the SCR catalyst to ensure that a desired conversion efficiency is maintained. Specifically, the conversion efficiency may be based on measurements from the upstream and downstream NOx sensors. The conversion efficiency, however, may decrease due to either a low quality reductant or a degraded SCR catalyst. FIG. 1, for example, illustrates increased reductant injection due to a low quality reductant (50% urea, 50% water). FIG. 1 includes a vertical axis A indicating a conversion efficiency of an SCR catalyst and horizontal axis B indicating time. For example, twice as much reductant injection may be required to maintain a desired NOx conversion efficiency (e.g., 100%, referred to by reference C). Determining the cause of the decreased conversion efficiency, however, may be difficult. Specifically, the SCR system may increase injection of the dosing agent when either a low quality reductant is being used or when the SCR catalyst is degraded (i.e., same corrective measures). In addition to being difficult to detect, replacing the SCR catalyst when low quality reductant is the cause of the decreased conversion efficiency may increase costs.

Figure 2:
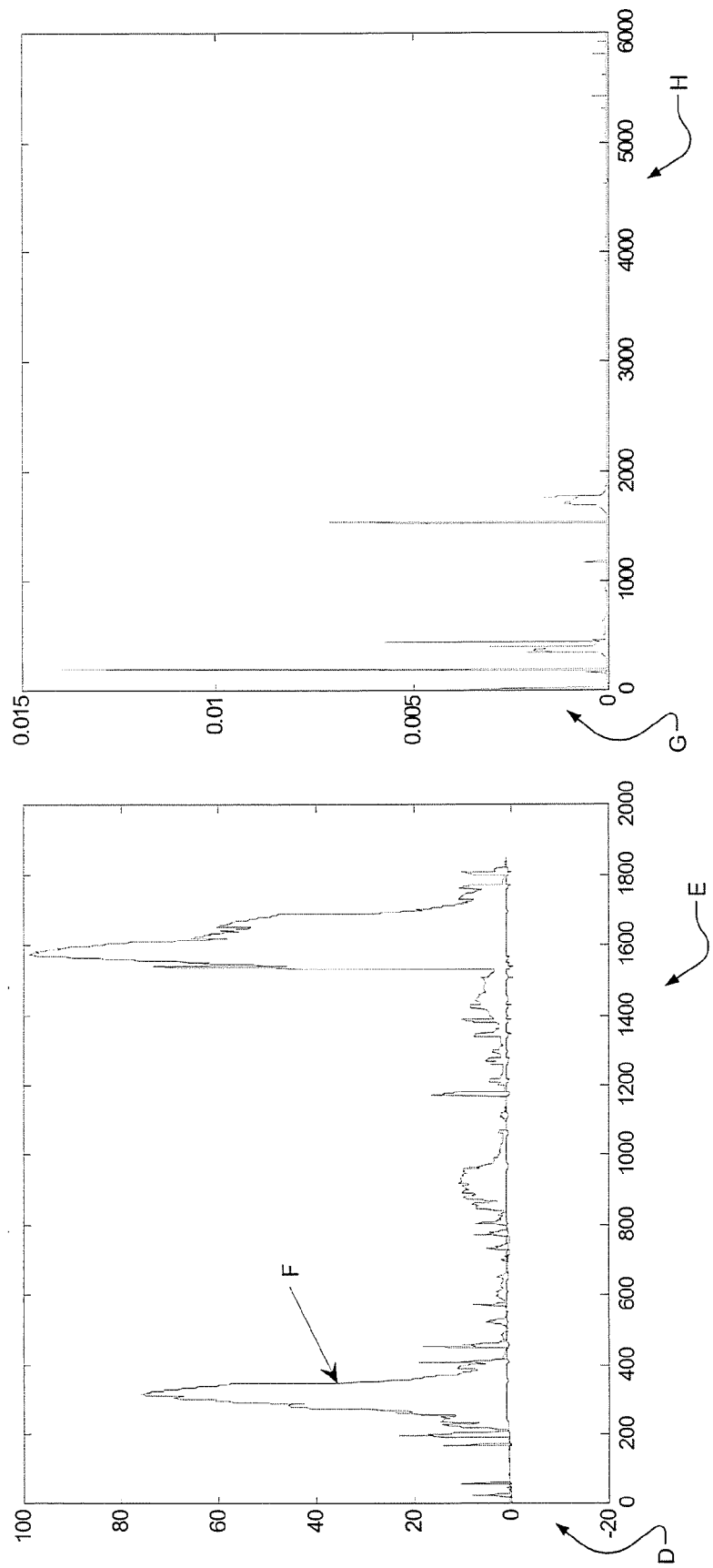
FIG. 2A is a graph illustrating increased ammonia slip due to a degraded catalyst.
FIG. 2B is a graph illustrating negligible ammonia slip due to a low quality reductant.

SCR systems, however, may generate distinguishable amounts of ammonia slip when low quality reductant is injected compared to when the SCR catalyst is degraded. For example, FIG. 2A illustrates increased ammonia ($NH_3$) slip due to a degraded catalyst. FIG. 2A includes a vertical axis D indicating an amount of ammonia slip in parts per million (PPM) and a horizontal axis E indicating time. Additionally, FIG. 2A includes a reference F indicating a spike in ammonia slip. FIG. 2B, on the other hand, illustrates ammonia slip due to injection of a low quality reductant. FIG. 2B includes a vertical axis G indicating ammonia slip in PPM and a horizontal axis H indicating time. As shown, the ammonia slip due the degraded catalyst is large compared to the ammonia slip due to injection of a low quality reductant which is negligible. Therefore, a cross-sensitive downstream NOx sensor may be used to accurately detect both a low quality reductant (i.e., low or negligible ammonia slip) and a degraded catalyst (i.e., high ammonia slip).

Accordingly, a system and method are presented for detecting reductant quality and catalyst degradation in an SCR system using a downstream NOx sensor. Alternatively, a downstream ammonia sensor may be used when the downstream NOx sensor is not cross-sensitive. The system and method may first determine a conversion efficiency of the SCR catalyst. For example, the conversion efficiency may be based on measurements from NOx sensors disposed upstream and downstream from the SCR catalyst. The system and method may then determine whether the conversion efficiency of an SCR catalyst is less than a predetermined threshold. When the conversion efficiency is less than the predetermined threshold, the system and method may then determine ammonia slip based on measurements from the downstream NOx sensor. In some embodiments, the system and method may determine the ammonia slip during a period when engine speed and/or exhaust temperature is greater than a corresponding threshold. For example, the ammonia slip detection may be performed during predetermined conditions where ammonia slip is likely to occur.

The system and method may then detect low quality reductant or a degraded catalyst. Specifically, the system and method may detect a low quality reductant when the measured ammonia slip is less than a first threshold. Alternatively, the system and method may detect a degraded catalyst when the measured ammonia slip is greater than a second threshold. For example, the second threshold may be greater than the first threshold. Alternatively, for example, the second threshold may be equal to the first threshold (i.e., a single threshold). The system and method may then generate pass/fail statuses for both the reductant and the catalyst based on the corresponding detections. Additionally, based on the pass/fail status signals, the system and method may adjust operation of the SCR system. This may include increasing or decreasing dosing to compensate for low quality reductant or SCR degradation thereby improving SCR system performance.

Figure 3:
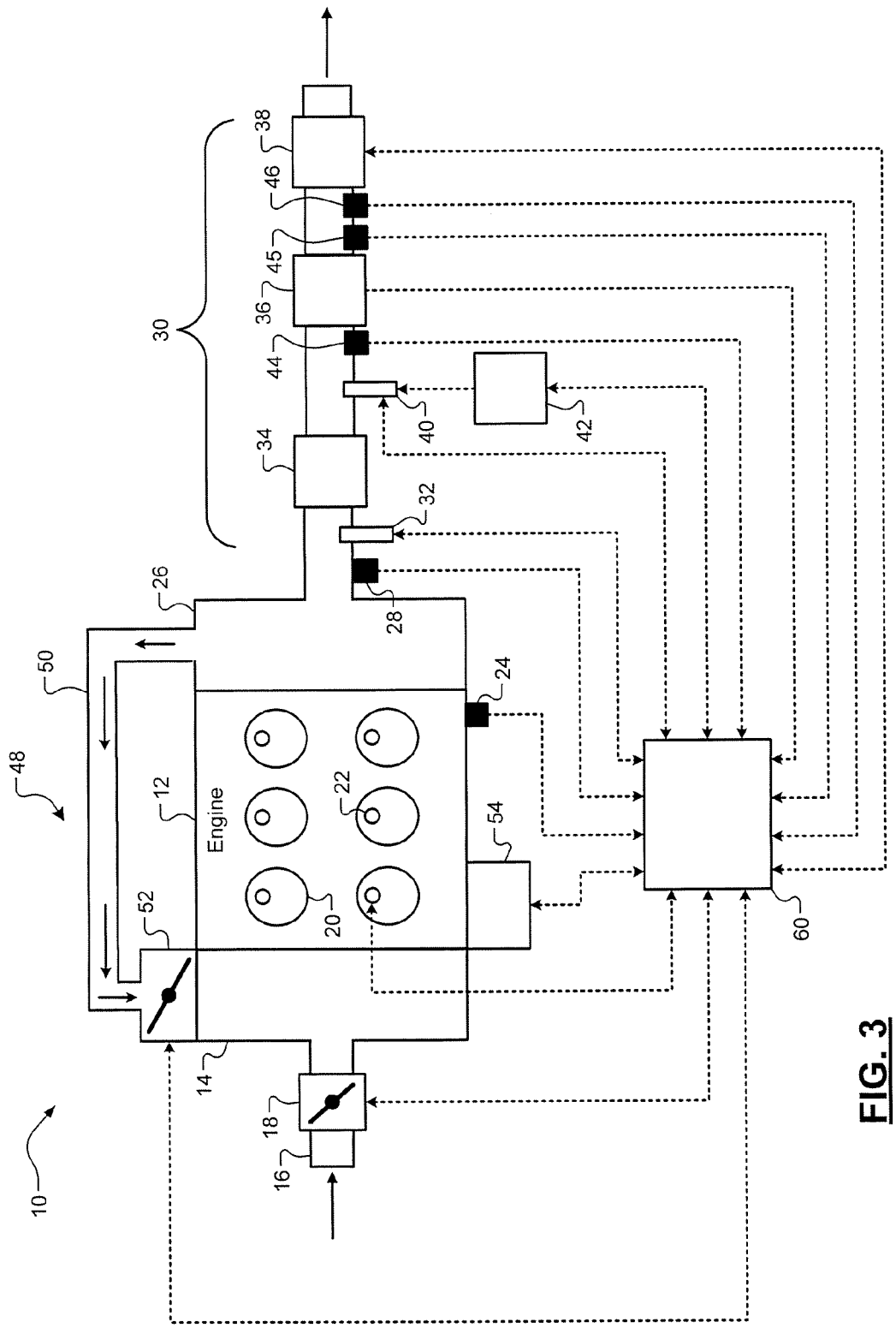
FIG. 3 is a functional block diagram of an engine system according to one implementation of the present disclosure.

Referring now to FIG. 3, an engine system 10 includes an engine 12. For example, the engine 12 may be a CI engine (e.g., a diesel engine). The engine 12, however, may also be a different type of engine (e.g., a homogeneous charge compression ignition, or HCCI engine). The engine 12 draws air into an intake manifold 14 through an inlet system 16 that may be regulated by a throttle 18. For example, the throttle 18 may be electrically controlled via electronic throttle control (ETC).

Air from the intake manifold 14 is distributed into a plurality of cylinders 20. While six cylinders are shown, it can be appreciated that the engine 12 may include other numbers of cylinders. Fuel injectors 22 may inject fuel directly into the cylinders 20. Alternatively, however, the fuel injectors 22 may inject fuel via intake ports of the cylinders 20. The fuel injectors 22 may also inject fuel into the cylinders 20 after combustion of the A/F mixture ("post-combustion injection") to introduce hydrocarbons (HC) into exhaust gas.

Pistons (not shown) compress and combust the A/F mixture within the cylinders 20. The pistons drive an engine crankshaft (not shown) during a power stroke to produce drive torque. In HCCI engines, the cylinders 20 may include spark plugs (not shown). An engine speed sensor 24 measures a rotational speed of the engine crankshaft (not shown). For example, the engine speed sensor 24 may measure the rotational speed in revolutions per minute, or RPM. Exhaust gas resulting from combustion is expelled into an exhaust manifold 26. The exhaust gas may then be treated by an exhaust treatment system and/or recirculated to the intake manifold 14 via an exhaust gas recirculation (EGR) system 48.

An exhaust mass air flow (EMAF) sensor 28 may measure a flow rate of exhaust gas into an exhaust treatment system 30. The exhaust treatment system 30 may include an auxiliary injector 32, an OC 34, an SCR catalyst 36, and a PM filter 38. The auxiliary injector 32 may selectively inject HC (e.g., fuel) into the exhaust gas. For example, the auxiliary injector 32 may inject HC into the exhaust gas to increase the exhaust gas temperature (EGT) for regeneration of the PM filter 38. As previously described, however, the fuel injectors 22 may perform post-combustion injection to introduce HC into the exhaust gas.

The OC 34 oxidizes CO and HC to form $CO_2$ and $H_2O$. The SCR catalyst 36 (in conjunction with a reductant such as ammonia) removes NOx from the exhaust gas. The PM filter 38 removes PM from the exhaust gas before the exhaust gas is released into the atmosphere. The exhaust treatment system 30 may further include a reductant injector 40, a reductant supply 42, first and second NOx sensors 44, 45, and a temperature sensor 46. In some implementations, there may be additional temperature sensors in order to determine an average temperature of the SCR catalyst 36. Alternatively, the average temperature of the SCR catalyst 36 may be determined using predetermined models. The reductant injector 40 and reductant supply 42 may also be referred to as a dosing agent injector and dosing agent supply, respectively. In other words, the dosing agent (e.g., urea) includes the reductant (e.g., ammonia).

The first and second NOx sensors 44, 45 measure an amount of NOx in the exhaust gas. The temperature sensor 46 measures a temperature of the exhaust gas. The first and second NOx sensors 44, 45 may be referred to as upstream NOx sensor 44 and downstream NOx sensor 45 referring to their locations in the exhaust stream with respect to the SCR catalyst 36. For example only, the NOX sensors 44, 45 may be "cross-sensitive" and thus may detect both NOx and $NH_3$. While two NOx sensors 44, 45 and one temperature sensor 46 are shown, the exhaust treatment system may include other numbers of NOx and/or temperature sensors. Additionally or alternatively, ammonia ($NH_3$) sensors may be implemented.

A control module 60 communicates with and/or controls various components of the engine system 10. Specifically, the control module 60 may receive signals from the engine speed sensor 24, the EMAF sensor 28, the reductant supply 42, the NOx sensors 44, 45, and the temperature sensor 46. The control module 60 may also control the throttle 18, the fuel injectors 22, spark plugs (not shown) (if implemented, such as in an HCCI engine), the auxiliary injector 32, the reductant injector 40, and an EGR valve 52 (discussed in more detail below). The control module 60 may also implement the system or method of the present disclosure.

The engine system 10 may further include the EGR system 48. The EGR system 48 includes the EGR valve 52 and an EGR line 50. The EGR system 48 may introduce a portion of exhaust gas from the exhaust manifold 26 into the intake manifold 14. The EGR valve 52 may be mounted on the intake manifold 14. The EGR line 50 may extend from the exhaust manifold 26 to the EGR valve 52, providing communication between the exhaust manifold 26 and the EGR valve 52. As previously described, the control module 60 may actuate the EGR valve 52 to control an amount of exhaust gas introduced into the intake manifold 14.

The engine 12 may also include a turbocharger 54. The turbocharger 54 may be driven by the exhaust gas received through a turbine inlet. For example only, the turbocharger 54 may include a variable nozzle turbine (VNT). The turbocharger 54 increases airflow into the intake manifold 14 to cause an increase in intake MAP (i.e., manifold absolute pressure, or boost pressure). The control module 60 may actuate the turbocharger 54 to selectively restrict the flow of the exhaust gas, thereby controlling the boost pressure.

Figure 4:
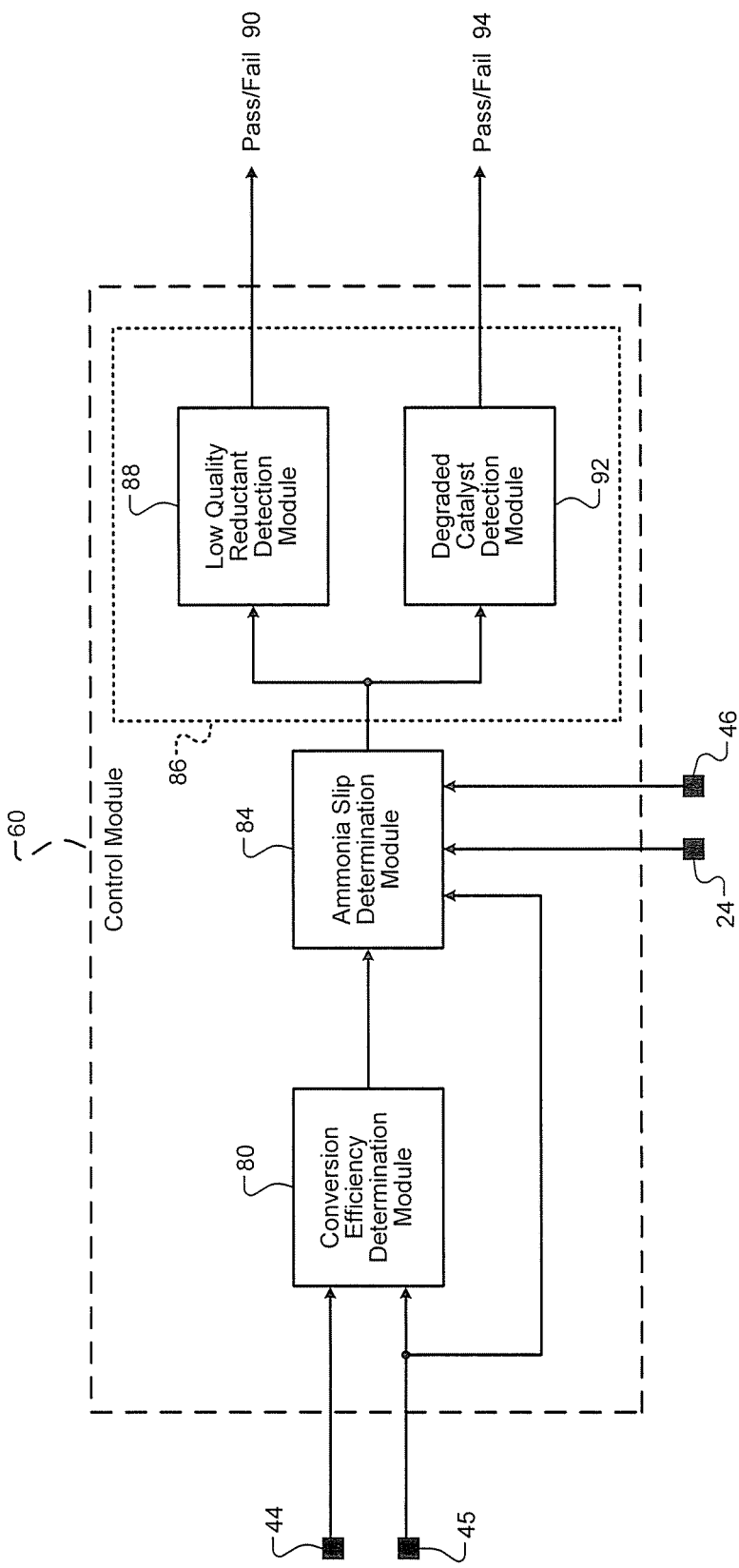
FIG. 4 is a functional block diagram of a control module according to one implementation of the present disclosure.

Referring now to FIG. 4, an example of the control module 60 is shown. The control module 60 may include a conversion efficiency determination module 80, an ammonia slip determination module 84, a low quality reductant detection module 88, and a degraded catalyst detection module 92. The low quality reductant detection module 88 and the degraded catalyst detection module 92 may also be referred to collectively as a diagnostic module 86.

The conversion efficiency determination module 80 determines a conversion efficiency of the SCR catalyst 36 based on measurements from the upstream and downstream NOx sensors 44, 45. For example, the conversion efficiency may be calculated as follows:

$$\eta = 1 - \frac{\int y}{\int x}, \tag{1}$$

where $\eta$ represents the conversion efficiency of the SCR catalyst 36, y represents the amount of NOx measured by the downstream NOx sensor 45, and x represents the amount of NOx measured by the upstream NOx sensor 44.

The ammonia slip determination module 84 receives the determined conversion efficiency from the conversion efficiency determination module 80. When determined conversion efficiency of the SCR catalyst 36 is less than the predetermined threshold, the ammonia slip determination module 84 may determine an amount of ammonia slip downstream from the SCR catalyst 36 (i.e., at the downstream NOx sensor 45). For example, the amount of ammonia slip may be determined as follows:

$$\text{Slip} = \Sigma_{i=1}^{N} NH_3(i) \tag{2},$$

where N represents a total number of measurement samples. In some embodiments, the ammonia slip determination module 84 may determine the amount of ammonia slip during a period (e.g., having N sample periods) when engine speed and/or exhaust temperature is greater than a predetermined threshold. In other words, the ammonia slip determination may be performed during predetermined conditions where ammonia slip is likely to occur.

The low quality reductant detection module 88 receives the determined amount of ammonia slip from the ammonia slip determination module 84. The low quality reductant detection module 88 detects whether a quality of a reductant in the reductant supply 42 is less than a first predetermined quality threshold. Specifically, the first predetermined quality threshold may correspond to a first ammonia slip threshold. Therefore, the low quality reductant detection module 88 may detect low quality reductant when the determined amount of ammonia slip is less than the first ammonia slip threshold. Based on the detection, the low quality reductant detection module 88 may generate a first pass/fail status 90. For example, when low quality reductant is detected the low quality reductant detection module 88 may generate a first fail status.

The first pass/fail status may be used for diagnostic purposes and/or for control of the exhaust treatment system 30. For example, a technician may read the first fail status and determine that low quality reductant is the cause of the low conversion efficiency. Accordingly, the reductant supply 42 may be drained and refilled with a desired reductant (e.g., a dosing agent such as pure urea). Additionally or alternatively, the control module 60 may control the exhaust treatment system 30 based on the first pass/fail status. For example, when the first fail status is generated the control module 60 may increase dosing agent injection to achieve a desired conversion efficiency (see, for example, FIG. 1).

The degraded catalyst detection module 92 also receives the determined amount of ammonia slip from the ammonia slip determination module 84. The degraded catalyst detection module 92 detects whether a quality of the SCR catalyst 36 is greater than a second predetermined quality threshold. Specifically, the predetermined quality threshold may correspond to a second ammonia slip threshold. Therefore, the degraded catalyst detection module 92 may detect a degraded SCR catalyst 36 when the determined amount of ammonia slip is greater than the second ammonia slip threshold.

For example, the second ammonia slip threshold may be greater than the first ammonia slip threshold. In some embodiments, however, a single ammonia slip threshold may be used. In other words, the first ammonia slip threshold may be equal to the second ammonia slip threshold. Based on the detection, the degraded catalyst detection module 92 may generate a second pass/fail status 94. For example, when a degraded SCR catalyst 36 is detected the degraded catalyst detection module 92 may generate a second fail status.

The second pass/fail status may also be used for diagnostic purposes and/or for control of the exhaust treatment system 30. For example, a technician may read the second fail status and determine that a degraded SCR catalyst 36 is the cause of the low conversion efficiency. Accordingly, the SCR catalyst 36 may be replaced. Additionally or alternatively, the control module 60 may control the exhaust treatment system 30 based on the second pass/fail status. For example, when the second fail status is generated the control module 60 may increase or decrease dosing agent injection to achieve a desired conversion efficiency.

Figure 5:
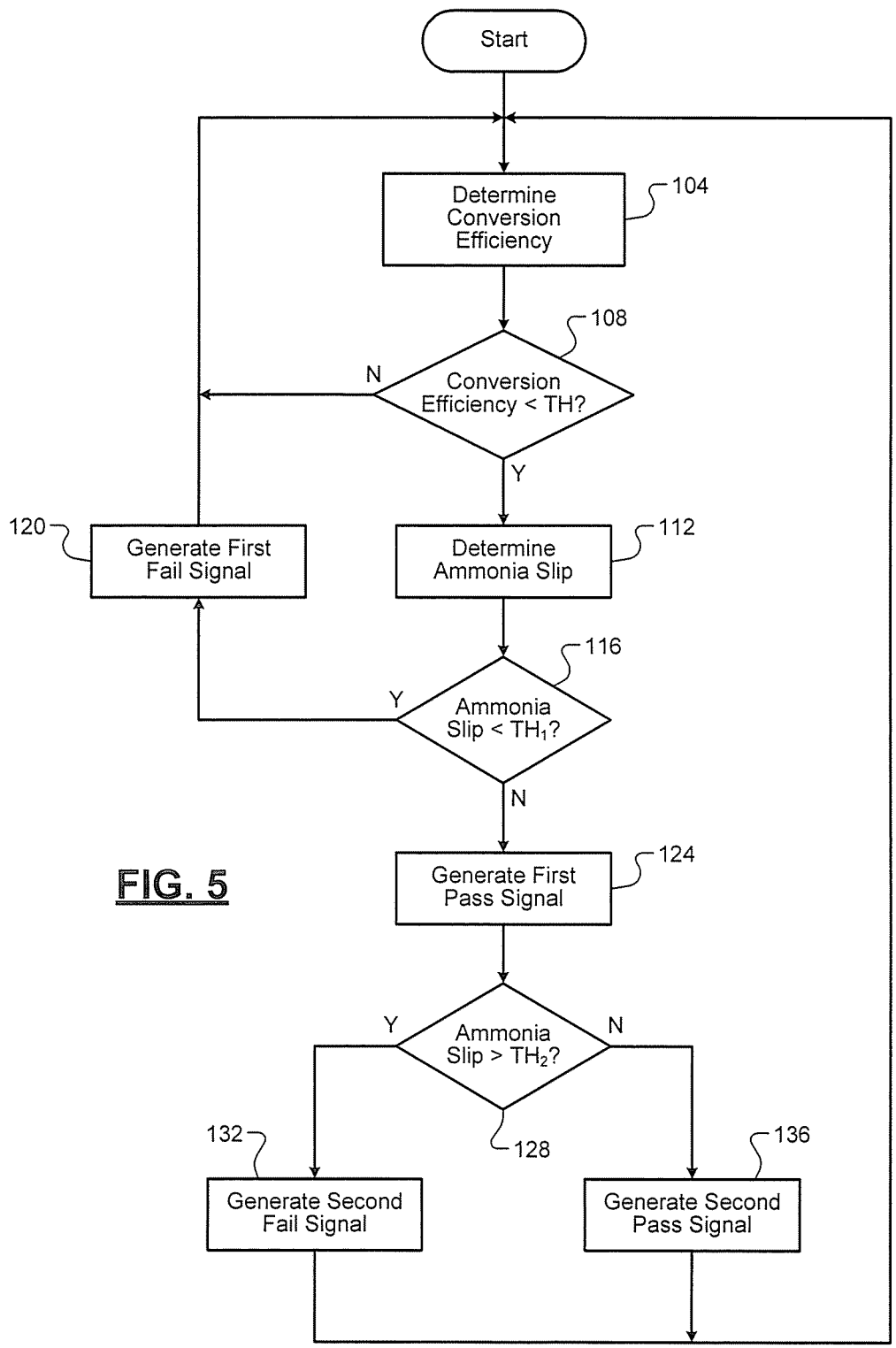
FIG. 5 is a flow diagram for a method of detecting low quality reductant and catalyst degradation according to one implementation of the present disclosure.

Referring now to FIG. 5, an example method for determining reductant quality and catalyst degradation begins at 104. At 104, control determines a conversion efficiency of the SCR catalyst 36. At 108, control determines whether the conversion efficiency is less than a predetermined threshold (TH). If true, control may proceed to 112. If false, control may return to 104.

At 112, control may determine an amount of ammonia slip at the downstream NOx sensor 45. In some embodiments, control may determine the amount of ammonia slip during a period when engine speed and/or exhaust temperature is greater than a corresponding threshold. In other words, the ammonia slip determination may be performed during predetermined conditions where ammonia slip is likely to occur. At 116, control may determine whether the amount of ammonia slip is less than the first ammonia slip threshold ($TH_1$). If true, control may proceed to 120. If false, control may proceed to 124. At 120, control may generate the first fail status indicating low quality reductant. Control may then return to 100.

At 124, control may generate a first pass status indicating sufficient quality reductant. At 128, control may determine whether the amount of ammonia slip is greater than the second ammonia slip threshold ($TH_2$). If true, control may proceed to 132. If false, control may proceed to 136. At 132, control may generate the second fail status indicating a degraded SCR catalyst 36. Control may then return to 100. At 136, control may generate a second pass status indicating a sufficient quality SCR catalyst 36. Control may then return to 100. Additionally, while first and second ammonia slip thresholds $TH_1$, $TH_2$ are described, control may compare the ammonia slip to a single ammonia slip threshold. In other words, the first ammonia slip threshold may be equal to the second ammonia slip threshold (i.e., $TH_1=TH_2$).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a selective catalytic reduction (SCR) system, comprising:
    a first electronic circuit configured to determine a conversion efficiency of an SCR catalyst;
    a second electronic circuit configured to determine an amount of ammonia slip across the SCR catalyst when the conversion efficiency is less than a predetermined threshold; and
    a third electronic circuit configured to:
    determine a first pass/fail status of a reductant supply based on the amount of ammonia slip and a first ammonia slip threshold; and
    determine a second pass/fail status of the SCR catalyst based on the amount of ammonia slip and a second ammonia slip threshold, wherein the second ammonia slip threshold is different from the first ammonia slip threshold.

2. The control system of claim 1, further comprising a fourth electronic circuit configured to generate the first pass/fail status for the reductant supply based on the amount of ammonia slip and the first ammonia slip threshold.

3. The control system of claim 2, wherein the fourth electronic circuit is configured to generate a first fail status indicating a low quality reductant when the amount of ammonia slip is less than the first ammonia slip threshold.

4. The control system of claim 3, further comprising a fifth electronic circuit configured to generate the second pass/fail status for the SCR catalyst based on the amount of ammonia slip and the second ammonia slip threshold.

5. The control system of claim 4, wherein the fifth electronic circuit is configured to generate a second fail status indicating a degraded SCR catalyst when the amount of ammonia slip is greater than the second ammonia slip threshold.

6. The control system of claim 5, wherein the second ammonia slip threshold is greater than the first ammonia slip threshold.

7. The control system of claim 5, wherein the SCR system increases or decreases reductant injection when one of the first and second fail statuses is generated.

8. The control system of claim 1, wherein the first electronic circuit is configured to determine the conversion efficiency of the SCR catalyst based on measurements from cross-sensitive nitrogen oxide (NOx) sensors disposed upstream and downstream from the SCR catalyst during a period having predetermined operating conditions where ammonia slip is likely to occur.

9. The control system of claim 8, wherein the second electronic circuit is configured to determine the amount of ammonia slip during a period when at least one of engine speed and exhaust temperature is greater than a corresponding threshold.

10. The control system of claim 1 wherein the first, second, and third electronic circuits include at least one of an Application Specific Integrated Circuit (ASIC), a processor and memory including one or more programs, and a combinational logic circuit.

11. A method for controlling a selective catalytic reduction (SCR) system, comprising:
    determining a conversion efficiency of an SCR catalyst;

determining an amount of ammonia slip across the SCR catalyst when the conversion efficiency is less than a predetermined threshold;

determining a first pass/fail status of a reductant supply based on the amount of ammonia slip and a first ammonia slip threshold; and determining a second pass/fail status of the SCR catalyst based on the amount of ammonia slip and a second ammonia slip threshold, wherein the second ammonia slip threshold is different from the first ammonia slip threshold.

12. The method of claim 11, further comprising generating the first pass/fail status for the reductant supply based on the amount of ammonia slip and the first ammonia slip threshold.

13. The method of claim 12, wherein generating the first pass/fail status includes generating a first fail status indicating a low quality reductant when the amount of ammonia slip is less than the first ammonia slip threshold.

14. The method of claim 13, further comprising generating the second pass/fail status for the SCR catalyst based on the amount of ammonia slip and the second ammonia slip threshold.

15. The method of claim 14, wherein generating the second pass/fail status includes generating a second fail status indicating a degraded SCR catalyst when the amount of ammonia slip is greater than the second ammonia slip threshold.

16. The method of claim 15, wherein the second ammonia slip threshold is greater than the first ammonia slip threshold.

17. The method of claim 15, further comprising increasing or decreasing reductant injection by the SCR system when one of the first and second fail statuses is generated.

18. The method of claim 11, further comprising determining the conversion efficiency of the SCR catalyst based on measurements from cross-sensitive nitrogen oxide (NOx) sensors disposed upstream and downstream from the SCR catalyst during a period having predetermined operating conditions where ammonia slip is likely to occur.

19. The method of claim 18, further comprising determining the amount of ammonia slip during a period when at least one of engine speed and exhaust temperature is greater than a corresponding threshold.

20. The method of claim 11 wherein the second ammonia slip threshold is greater than the first ammonia slip threshold.

* * * * *